US009869078B2

(12) United States Patent
Wieber et al.

(10) Patent No.: US 9,869,078 B2
(45) Date of Patent: Jan. 16, 2018

(54) FLUSH SYSTEM FOR A TOILET

(71) Applicant: Transcendent Holdings LLC, Fowler, MI (US)

(72) Inventors: Kory Wieber, Fowler, MI (US); Dennis Martin, Fowler, MI (US); Scott Halfmann, Westphalia, MI (US)

(73) Assignee: Transcendent Holdings LLC, Fowler, MI (US)

( * ) Notice: Subject to any disclaimer, the term of this patent is extended or adjusted under 35 U.S.C. 154(b) by 0 days.

(21) Appl. No.: 15/088,488

(22) Filed: Apr. 1, 2016

(65) Prior Publication Data

US 2017/0284075 A1  Oct. 5, 2017

(51) Int. Cl.
*E03D 3/06* (2006.01)
*F16K 5/06* (2006.01)
*E03D 13/00* (2006.01)
*E03D 5/09* (2006.01)
*F16K 15/00* (2006.01)

(52) U.S. Cl.
CPC ............. *E03D 3/06* (2013.01); *E03D 5/09* (2013.01); *E03D 13/00* (2013.01); *F16K 5/06* (2013.01); *F16K 15/00* (2013.01)

(58) Field of Classification Search
CPC .............. E03D 3/06; E03D 5/09; E03D 13/00
See application file for complete search history.

(56) References Cited

U.S. PATENT DOCUMENTS

| 3,556,137 | A | | 1/1971 | Billeter et al. |
| 4,883,254 | A | | 11/1989 | Whiteside |
| 5,188,335 | A | | 2/1993 | Pettinaroli |
| 5,996,613 | A | * | 12/1999 | Bertolotti ............... F16K 35/06 137/383 |
| 8,256,037 | B1 | | 9/2012 | Culver et al. |

OTHER PUBLICATIONS

Sloan Valve Company, Diaphragm or Piston Flushometers? It Depends . . . , Copyright 2012.

* cited by examiner

*Primary Examiner* — Janie Loeppke
(74) *Attorney, Agent, or Firm* — Brooks Kushman P.C.

(57) ABSTRACT

A flush system includes a meter valve, a first pipe, a vacuum breaker, a second pipe, and a ball valve assembly. The meter valve defines a selectively openable outlet. The first pipe is in fluid communication with the meter valve and a water supply source. The vacuum breaker is disposed within the first pipe upstream of the meter valve and oriented to prevent backflow from the meter valve to the water supply source. The second pipe extends from a wall and is downstream from the supply source. The ball valve assembly is disposed between the first pipe and the second pipe upstream of the vacuum breaker to facilitate fluid communication between the first pipe and the second pipe and to selectively isolate the meter valve from the water supply source.

17 Claims, 2 Drawing Sheets

FLUSH SYSTEM FOR A TOILET

TECHNICAL FIELD

The present disclosure relates to flush systems associated with bathroom fixtures including toilets.

BACKGROUND

Flush systems that are used in conjunction with toilets and urinals often include water metering devices that are configured to limit the amount of water that is dispensed during each flush.

SUMMARY

A flush system includes a meter valve, a first pipe, a vacuum breaker, a second pipe, and a ball valve assembly. The meter valve defines a selectively openable outlet. The first pipe is in fluid communication with the meter valve and a water supply source. The vacuum breaker is disposed within the first pipe upstream of the meter valve and oriented to prevent backflow from the meter valve to the water supply source. The second pipe extends from a wall and is downstream from the supply source. The ball valve assembly is disposed between the first pipe and the second pipe upstream of the vacuum breaker to facilitate fluid communication between the first pipe and the second pipe and to selectively isolate the meter valve from the water supply source. The ball valve assembly may be arranged between the first and second pipes to direct water flow from the second pipe flowing in a first direction to a second direction of flow within the first pipe in which the second direction is offset substantially ninety degrees relative to the first direction. The ball valve assembly may have an engageable key arranged with a ball valve of the ball valve assembly to transition the ball valve between an open state and a closed state. The meter valve may be in fluid communication with a receptacle of one of a toilet and a urinal. The first pipe may be of a length such that the ball valve assembly is located proximate to the meter valve.

A flush system includes a meter valve, a receptacle, first and second pipes, and a ball valve assembly. The meter valve selectively opens to direct water flowing therethrough to an outlet pipe. The receptacle is open to the outlet pipe. Each of the first and second pipes is in fluid communication with the meter valve. The ball valve assembly is disposed between the pipes, upstream of the meter valve, in fluid communication with the meter valve and a water supply source, and arranged with the pipes to isolate the meter valve from the water supply source. A vacuum breaker valve may be disposed within the first pipe between the meter valve and the ball valve assembly. A vacuum breaker valve may be disposed upstream of the meter valve and downstream of the ball valve assembly. The ball valve assembly may be structured to transition a flow direction of water within the second pipe substantially ninety degrees into the first pipe and relative to a wall in which the second pipe extends therefrom. The ball valve assembly may include an engageable key arranged with a ball valve of the ball valve assembly to transition the ball valve between an open state and a closed state. The receptacle may be part of one of a toilet and a urinal. The first pipe may define a length such that the ball valve is located proximate to the meter valve.

A waste disposal system includes a receptacle, a meter valve, first and second inlet pipes, and a ball valve assembly. The receptacle may receive waste. The meter valve defines an outlet open to the receptacle, and is configured to selectively open the outlet for water to flow therethrough. The first and second inlet pipes are in fluid communication with the meter valve and a water supply source, the second inlet pipe extends from a wall. The ball valve assembly is located proximate the wall and secured to the first inlet pipe upstream of the meter valve and secured to the second inlet pipe downstream of the supply source. The ball valve assembly is configured to selectively isolate the meter valve from the supply source. A vacuum breaker valve may be disposed within the first inlet pipe between the meter valve and ball valve assembly. The vacuum breaker valve may be upstream of the meter valve and downstream of the ball valve. The ball valve assembly may be configured to alter a flow direction of water within the system substantially ninety degrees relative to a wall in which the second inlet pipe extends therefrom. The ball valve assembly may include an engageable key arranged with a ball valve of the ball valve assembly to transition the ball valve between an open state and a closed state. The receptacle may be a part of one of a toilet and a urinal. A drain may be included to direct waste and water out of the receptacle.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
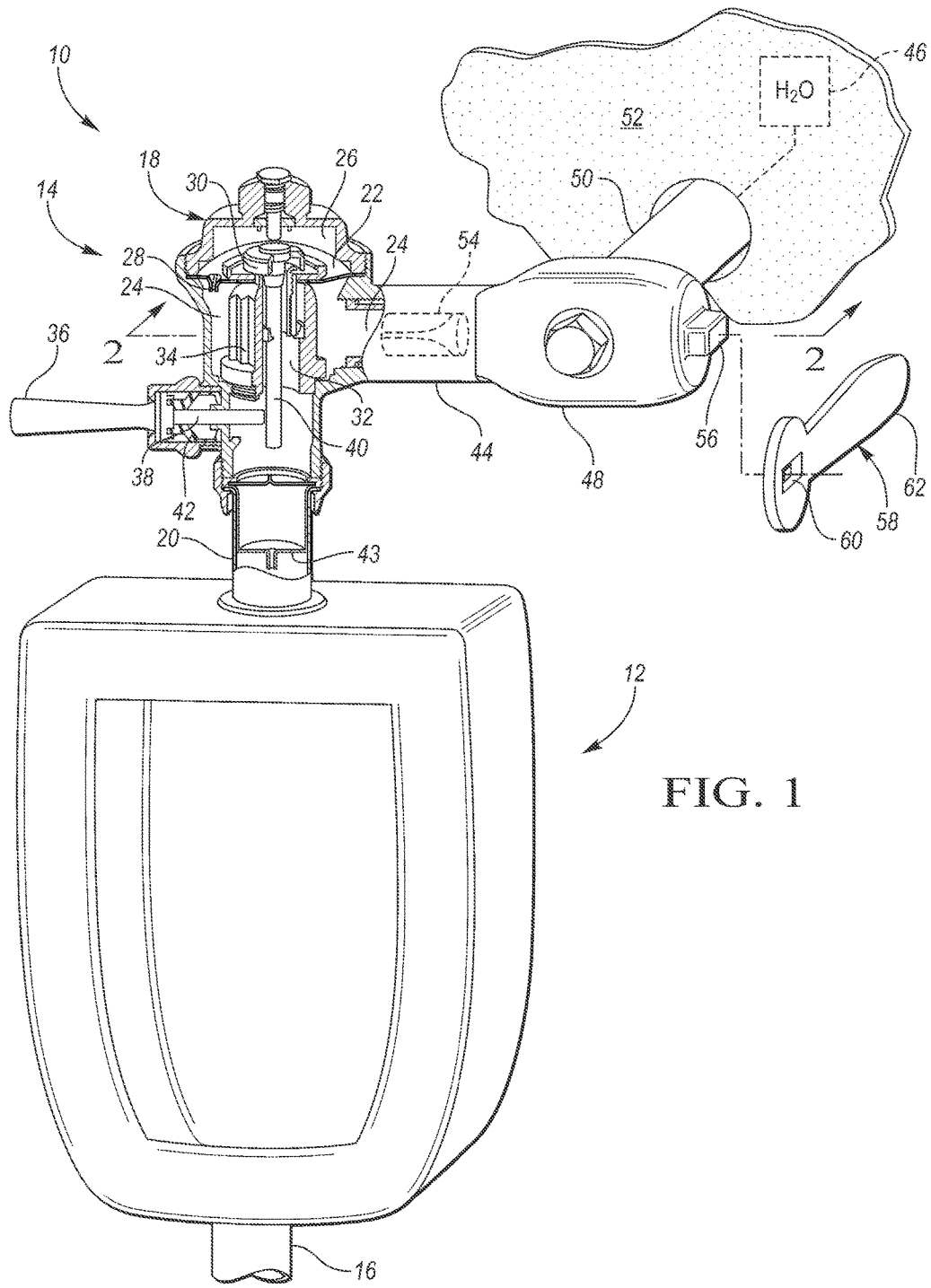
FIG. 1 is a perspective view of a waste disposal system including a waste receptacle and a flush system.

Referring to FIG. 1, a perspective view of a waste disposal system 10 including a waste receptacle 12 and a flush system 14 is illustrated. The receptacle 12 may receive waste. For example, the receptacle 12 may be part of a urinal or a toilet to receive human waste. The flush system 14 is in fluid communication with a water source (not shown). For example, the water source may be a municipal water system. The flush system 14 is in fluid communication with the receptacle 12 to direct water thereto. Water directed to the receptacle 12 may in turn flush any waste located in the receptacle 12 to a drain (or drain pipe) 16. The drain 16 is configured to direct the waste and water from the receptacle 12 to a municipal sanitation or sewage system. The flush system 14 includes a metering or meter valve 18 that is configured to supply a predetermined amount of water to the receptacle 12 when activated. Each activation of the meter valve 18 may be referred to as a "flush cycle" herein. The meter valve 18 may be designed or adjusted to supply only a specific amount of water (with an allowable deviation) to the receptacle 12 per flush cycle. The meter valve 18 may define or include an outlet (or outlet pipe) 20 that connects the meter valve 18 to the receptacle 12 such that the meter valve 18 is in fluid communication with the receptacle 12.

The meter valve 18 may be a diaphragm-type meter valve. The meter valve 18 may include a flexible diaphragm 22 that separates a lower chamber 24 from an upper chamber 26. The diaphragm 22 may define a bypass hole 28 that allows a small amount of water to flow from the lower chamber 24 to the upper chamber 26. The pressure of the water in the upper chamber 26 above the diaphragm 22 creates a force that compress the diaphragm 22 and a relief valve 30 that is attached to the diaphragm 22 such that the diaphragm 22 and relief valve 30 form a seal over an opening 32 defined by a valve barrel 34.

The meter valve 18 may be activated when a user presses on an activation handle 36 that extends from the meter valve 18. The activation handle 36 contacts a plunger 38 that shifts a stem 40 of the relief valve 30, causing the relief valve 30 to tilt. A seal 42 may be disposed between the activation handle 36 and the plunger 38 to prevent water from leaking out and around the activation handle 36. When the relief valve 30 tilts, a desired amount of water exits the upper chamber 26, flows through the opening 32 defined by the valve barrel 34, and into the outlet 20. A first vacuum breaker 43 may be disposed within the meter valve 18 downstream of the relief valve 30. The first vacuum breaker 43 may be a duck-billed type, umbrella type, or any check or relief valve known in the art. The first vacuum breaker 43 may be configured to allow fluid to flow in a direction away from the relief valve 30 while also preventing flow in the opposite direction towards the relief valve 30.

When the relief valve 30 is tilted, a pressure imbalance is created between the upper chamber 26 and the lower chamber 24. For example, the pressure in the upper chamber 26 becomes less than the pressure in the lower chamber 24. The lower pressure in the upper chamber 26 causes the diaphragm 22 and the relief valve 30 to rise up exposing the opening 32 defined by the valve barrel 34 allowing water to flow from the upper chamber 26, through the opening 32, and into the outlet 20. The relief valve 30 then re-seats over the opening 32 defined by the valve barrel 34 and water begins to refill the upper chamber 26 through the bypass hole 28 defined by the diaphragm 22. As water begins to refill the upper chamber 26, pressure builds up and depresses depressing the diaphragm 22, which in turn closes the opening 32 defined by the valve barrel 34.

Alternatively, the meter valve 18 may be referred to as a flush meter, flushometer, or flushing valve. In the above described embodiment the meter valve 18 is shown to be a diaphragm-type meter valve. It should be understood however that the meter valve 18 may be another type of suitable meter valve, flush meter, flushometer, or flushing valve known in the art. For example, the meter valve 18 may be a piston type flushometer.

A first inlet (or first inlet pipe) 44 may be secured to the meter valve 18. The first inlet 44 may be in fluid communication with the meter valve 18 and a water supply source 46. The first inlet 44 may be configured to direct water from the water supply source 46 to the meter valve 18. A ball valve assembly 48 may be secured to the first inlet 44 upstream of the meter valve 18 and downstream of the water supply source 46. The first inlet 44 pipe may be a predetermined length such that the ball valve assembly 48 is located proximate to the meter valve 18. For example, the first inlet pipe 44 may be less than six inches in length such that the ball valve assembly 48 is located within six inches of meter valve 18. Locating the ball valve assembly 48 proximate to the meter valve 18 allows for localized water shut-off to an individual toilet or urinal when repairs are required. Previous solutions may have required shutting off the water to an entire bank of toilets or urinals when only one required repairs.

The ball valve assembly 48 may be in fluid communication with the meter valve 18 and the water supply source 46. The ball valve assembly 48 may be configured direct water from the water supply source 46 to the meter valve 18 when in an open state. The ball valve assembly 48 may be configured to isolate the meter valve 18 from the water supply source 46 when in a closed state. The ball valve assembly 48 may direct water from the water supply source 46 to the meter valve 18 along a path which includes a substantially 90° turn relative to a supporting wall when in the open state. Substantially 90° may include 90° plus or minus a minimal or negligible deviation from 90°. For example, substantially 90° may include 90° plus or minus 5°. There could be other suitable configurations where the ball valve does not include a turn or includes a turn anywhere from 0° to 180°. A second inlet (or second inlet pipe) 50 may be secured to the ball valve assembly 48 upstream of the ball valve assembly 48 and downstream of the water supply source 46. The second inlet 50 may be in fluid communication with the ball valve assembly 48 and the water supply source 46. The second inlet 50 may extend through a wall 52 that is disposed between the water supply source 46 and the flush system 14.

A second vacuum breaker 54 may be disposed between the water supply source 46 and the meter valve 18. The second vacuum breaker 54 may be oriented to prevent backflow of water from the meter valve 18 to the water supply source 46. More specifically, the second vacuum breaker 54 may be disposed within the first inlet 44 between the meter valve 18 and the ball valve assembly 48 such that the second vacuum breaker 54 is upstream of the meter valve 18 and downstream of the ball valve assembly 48. The second vacuum breaker 54 may also be a duck-billed type, umbrella type, or any other check or relief valve known in the art. The second vacuum breaker 54 may be configured to allow fluid to flow in a direction toward the meter valve 18 while also preventing flow in the opposite direction towards the ball valve assembly 48 and the water supply source 46.

The ball valve assembly 48 may include an engageable key 56. The engageable key 56 may be configured to rotate about an axis to transition the ball valve assembly 48 between an open state and a closed state. A tool 58 that defines a keyway 60 may be configured to engage the engageable key 56 of the ball valve assembly 48 in order to transition the ball valve assembly 48 between the open state and the closed state. The tool 58 may include a handle 62 to provide leverage.

Figure 2:
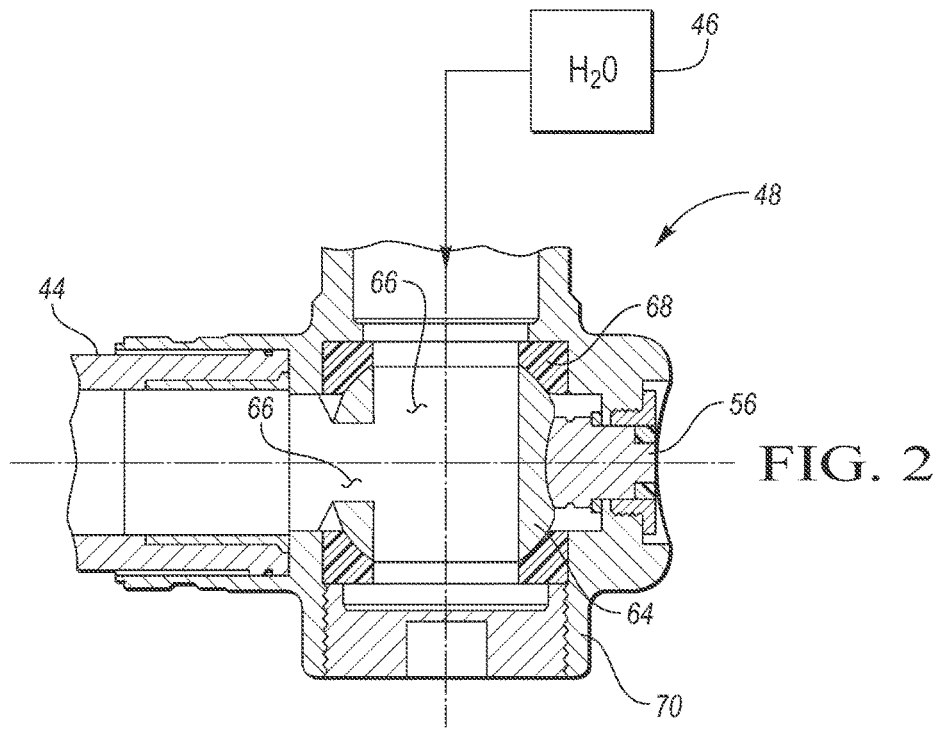
FIG. 2 is a cross-sectional view of a ball valve in an open state taken along line 2-2 of FIG. 1.
Figure 3:
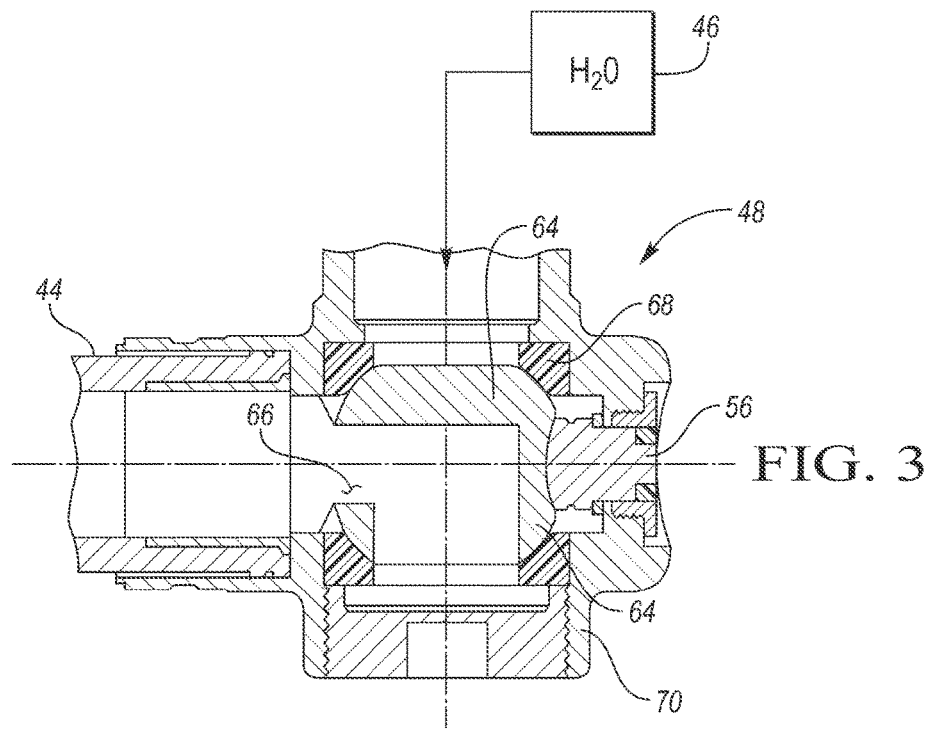
FIG. 3 is a cross-sectional view of the ball valve of FIG. 2 shown in a closed state taken along line 2-2 of FIG. 1.

Referring to FIGS. 2 and 3, cross-sectional views of the ball valve assembly 48 in the open state and the closed state are illustrated, respectively. The ball valve assembly 48 includes a rotatable ball 64 that defines at least one pathway 66. When in an open state, water may flow through the pathway 66 defined by the rotatable ball 64 from the water supply source 46 to the first inlet 44. When in a closed state, water is prevented from flowing from the water supply source 46 to the first inlet 44. The rotatable ball 64 may be disposed within a sleeve 68 that creates a seal between the rotatable ball 64 and an outer housing 70 of the ball valve assembly 48 in order to prevent water from flowing around and between the rotatable ball 64 and the outer housing 70. The engageable key 56 may be secured to the rotatable ball 64 such that rotation of the engageable key 56 rotates the rotatable ball 64 to transition the ball valve assembly 48 between the open state and the closed state.

The words used in the specification are words of description rather than limitation, and it is understood that various changes may be made without departing from the spirit and scope of the disclosure. As previously described, the features of various embodiments may be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A flush system comprising:
   a meter valve defining a selectively openable outlet;
   a first pipe in fluid communication with the meter valve and a water supply source;
   a vacuum breaker disposed within the first pipe upstream of the meter valve and oriented to prevent backflow from the meter valve to the water supply source;
   a second pipe extending from a wall and downstream from the water supply source; and
   a ball valve assembly disposed between the first pipe and the second pipe upstream of the vacuum breaker to facilitate fluid communication between the first pipe and the second pipe and to selectively isolate the meter valve from the water supply source,
   wherein the ball valve assembly is structured to transition a flow direction of water within the second pipe substantially ninety degrees into the first pipe and relative to the wall.

2. The flush system of claim 1, wherein the ball valve assembly is arranged between the first and second pipes to direct water flow from the second pipe flowing in a first direction to a second direction of flow within the first pipe in which the second direction is offset substantially ninety degrees relative to the first direction.

3. The flush system of claim 2, wherein the ball valve assembly has an engageable key arranged with a ball valve of the ball valve assembly to transition the ball valve between an open state and a closed state.

4. The flush system of claim 1, wherein the meter valve is in fluid communication with a receptacle of one of a toilet and a urinal.

5. The flush system of claim 1, wherein the first pipe is of a length such that the ball valve assembly is located six inches or less from the meter valve.

6. A flush system comprising:
   a meter valve to selectively open to direct water flowing therethrough to an outlet pipe;
   a receptacle open to the outlet pipe;
   first and second pipes in fluid communication with the meter valve; and
   a ball valve assembly disposed between the first and second pipes, upstream of the meter valve, in fluid communication with the meter valve and a water supply source, and arranged with the pipes to isolate the meter valve from the water supply source,
   wherein the ball valve assembly is structured to transition a flow direction of water within the second pipe substantially ninety degrees into the first pipe and relative to a wall in which the second pipe extends therefrom.

7. The flush system of claim 6, wherein a vacuum breaker valve is disposed within the first pipe between the meter valve and the ball valve assembly.

8. The flush system of claim 6, wherein a vacuum breaker valve is disposed upstream of the meter valve and downstream of the ball valve assembly.

9. The flush system of claim 6, wherein the ball valve assembly comprises an engageable key arranged with a ball valve of the ball valve assembly to transition the ball valve between an open state and a closed state.

10. The flush system of claim 6, wherein the receptacle is a part of one of a toilet and a urinal.

11. The flush system of claim 6, wherein the first pipe defines a length such that the ball valve assembly is located proximate to the meter valve.

12. A waste disposal system comprising:
    a receptacle to receive waste;
    a meter valve defining an outlet open to the receptacle, and configured to selectively open the outlet for water to flow therethrough;
    first and second inlet pipes in fluid communication with the meter valve and a water supply source, the second inlet pipe extending from a wall; and
    a ball valve assembly proximate the wall and secured to the first inlet pipe upstream of the meter valve and secured to the second inlet pipe downstream of the water supply source, wherein the ball valve assembly is configured to selectively isolate the meter valve from the supply source,
    wherein the ball valve assembly is configured to alter a flow direction of water within the system substantially ninety degrees relative to a wall in which the second inlet pipe extends therefrom.

13. The waste disposal system of claim 12, wherein a vacuum breaker valve is disposed within the first inlet pipe between the meter valve and ball valve assembly.

14. The waste disposal system of claim 12, wherein a vacuum breaker valve is upstream of the meter valve and downstream of the ball valve assembly.

15. The waste disposal system of claim 12, wherein the ball valve assembly comprises an engageable key arranged with a ball valve of the ball valve assembly to transition the ball valve between an open state and a closed state.

16. The waste disposal system of claim 12, wherein the receptacle is a part of one of a toilet and a urinal.

17. The waste disposal system of claim 12, further comprising a drain configured to direct waste and water out of the receptacle.

* * * * *

UNITED STATES PATENT AND TRADEMARK OFFICE
CERTIFICATE OF CORRECTION

| | | |
|---|---|---|
| PATENT NO. | : 9,869,078 B2 | Page 1 of 1 |
| APPLICATION NO. | : 15/088488 | |
| DATED | : January 16, 2018 | |
| INVENTOR(S) | : Kory Wieber et al. | |

It is certified that error appears in the above-identified patent and that said Letters Patent is hereby corrected as shown below:

On the Title Page

Delete:
"(71) Applicant: Transcendent Holdings LLC, Fowler, MI (US)"
And Insert:
--(71) Applicant: Transcedent Holdings LLC, Fowler, MI (US)--.

Delete:
"(73) Assignee: Transcendent Holdings LLC, Fowler, MI (US)"
And Insert:
--(73) Assignee: Transcedent Holdings LLC, Fowler, MI (US)--.

Signed and Sealed this
Eleventh Day of June, 2024

Katherine Kelly Vidal
*Director of the United States Patent and Trademark Office*